(12) United States Patent
Eldridge et al.

(10) Patent No.: US 8,697,301 B2
(45) Date of Patent: Apr. 15, 2014

(54) FUEL CELL USING CARBON NANOTUBES

(75) Inventors: Benjamin N. Eldridge, Danville, CA (US); John K. Gritters, Livermore, CA (US); Onnik Yaglioglu, Emeryville, CA (US)

(73) Assignee: FormFactor, Inc., Livermore, CA (US)

( * ) Notice: Subject to any disclaimer, the term of this patent is extended or adjusted under 35 U.S.C. 154(b) by 510 days.

(21) Appl. No.: 13/015,848

(22) Filed: Jan. 28, 2011

(65) Prior Publication Data

US 2011/0189564 A1  Aug. 4, 2011

Related U.S. Application Data

(60) Provisional application No. 61/299,782, filed on Jan. 29, 2010, provisional application No. 61/332,422, filed on May 7, 2010.

(51) Int. Cl.
  *H01M 8/06* (2006.01)

(52) U.S. Cl.
  USPC ............ 429/423; 429/530; 429/532; 429/535

(58) Field of Classification Search
  USPC .......... 429/116, 423, 515, 530, 532, 534, 535
  See application file for complete search history.

(56) References Cited

U.S. PATENT DOCUMENTS

| | | | |
|---|---|---|---|
| 6,706,431 B2 * | 3/2004 | Kawamura et al. | 429/532 X |
| 7,090,942 B2 * | 8/2006 | Bunker | 429/513 X |
| 7,179,561 B2 * | 2/2007 | Niu et al. | 429/535 X |
| 7,285,353 B2 * | 10/2007 | Lisi et al. | 429/530 X |
| 7,838,159 B2 * | 11/2010 | Gorobinskiy et al. | 429/423 X |
| 2006/0115712 A1 * | 6/2006 | Kim et al. | 429/44 |

* cited by examiner

Primary Examiner — Stephen J. Kalafut
(74) Attorney, Agent, or Firm — Kirton McConkie

(57) ABSTRACT

A fuel cell comprises an anode, a cathode, and a proton exchange membrane. The anode and cathode can include a catalyst layer which includes a plurality of generally aligned carbon nanotubes. Methods of making a fuel cell are also disclosed.

23 Claims, 14 Drawing Sheets

FUEL CELL USING CARBON NANOTUBES

This application claims the benefit of U.S. Provisional Patent Application Ser. No. 61/299,782 filed Jan. 29, 2010, entitled "Fuel Cell Using Carbon Nanotubes" and also claims the benefit of U.S. Provisional Patent Application Ser. No. 61/332,422 filed May 7, 2010, entitled "Portable Fuel Cell", each of which is incorporated by reference in its entirety.

This application is related to and incorporates by reference in its entirety U.S. patent application Ser. No. 12/632,428, filed Dec. 7, 2009, entitled "Carbon Nanotube Columns and Methods of Making and Using Carbon Nanotube Columns as Probes".

BACKGROUND

A fuel cell is a device that takes chemical inputs such as methanol and hydrogen and converts them into electricity through catalytic reactions. An initial catalytic reaction occurs on an input side of the fuel cell where input reactants are separated into component hydrogen ions and protons in the presence of the catalyst. A common catalyst is platinum and/or its alloys. The separated electrons flow through a circuit which creates electrical power and the hydrogen ions flow through a hydrogen permeable membrane. At the other side of the membrane another catalytic reaction occurs where the electrons are combined with the hydrogen ions to create waste products. Fuel cells can be combined in various ways to increase the current or voltage of the system. For example, fuel cells can be combined in parallel to increase the current supplied to an attached load and fuel cells can be combined in series to increase a supplied voltage. An additional method to increase a fuel cell's current can be to increase the fuel cell reactive surface. Unfortunately methods to increase the fuel cell reactive surface result in larger fuel cells which are not conducive to small scale applications of fuel cell technology, nor highly efficient.

SUMMARY

In some embodiments a fuel cell is provided. The fuel cell can include an anode, a cathode, and a proton exchange membrane disposed between the anode and the cathode. The anode and cathode can each include a catalyst layer having a plurality of generally aligned carbon nanotubes. Electrical connections can be provided to the anode and cathode.

In some embodiments a method of making a fuel cell is provided. The method can include obtaining a substrate having generally aligned carbon nanotubes. The substrate can be placed into a chamber and a first precursor gas can be applied into the chamber. The first precursor gas can include molecules having affinity to carbon to create a monomer layer surrounding the carbon nanotubes. A second precursor gas can applied into the chamber. The second precursor gas can include molecules having affinity to said first precursor gas. The second precursor gas can react with the monomer layer to produce a catalyst layer on the carbon nanotubes thereby forming an electrode. Another operation in the method can be assembling two electrodes with a proton exchange membrane to form the fuel cell.

DETAILED DESCRIPTION

This specification describes example embodiments and applications of the invention. The invention, however, is not limited to these example embodiments and applications or to the manner in which the example embodiments and applications operate or are described herein. Moreover, the Figures may show simplified or partial views, and the dimensions of elements in the Figures may be exaggerated or otherwise not in proportion for clarity. In addition, as the terms "on," "attached to," or "coupled to" are used herein, one object (e.g., a material, a layer, a substrate, etc.) can be "on," "attached to," or "coupled to" another object regardless of whether the one object is directly on, attached, or coupled to the other object or there are one or more intervening objects between the one object and the other object. Also, directions (e.g., above, below, top, bottom, side, up, down, under, over, upper, lower, horizontal, vertical, "x," "y," "z," etc.), if provided, are relative and provided solely by way of example and for ease of illustration and discussion and not by way of limitation. In addition, where reference is made to a list of elements (e.g., elements a, b, c), such reference is intended to include any one of the listed elements by itself, any combination of less than all of the listed elements, and/or a combination of all of the listed elements.

Figure 1:
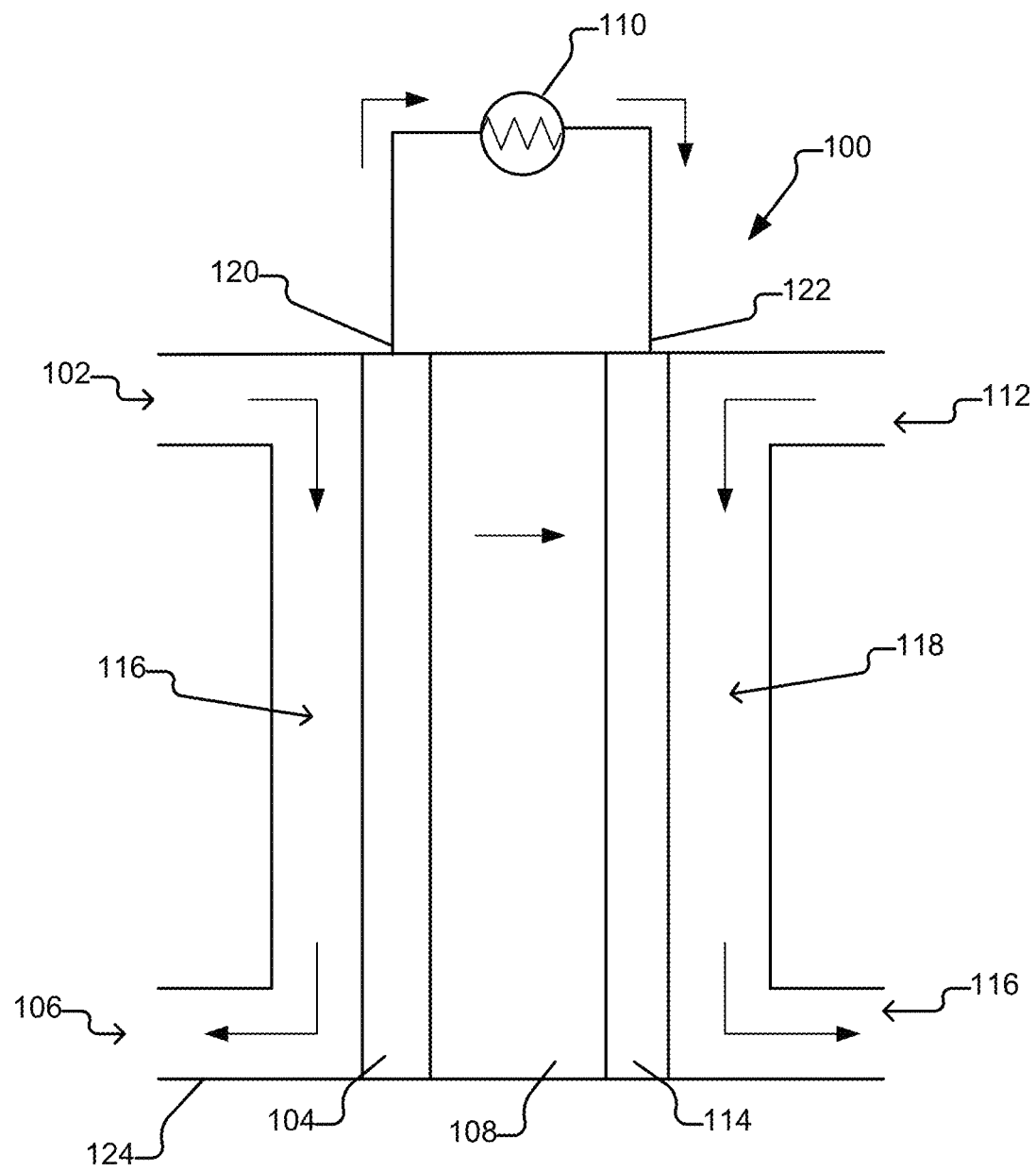
FIG. 1 illustrates an example of a hydrogen fuel cell according to some embodiments of the invention.

FIG. 1 illustrates the basic structure and operation of a fuel cell 100. The fuel cell 100 can include a reactant inlet port 102, an anode 104, an outlet port 106, a proton exchange membrane (PEM) 108 (this can in some cases be referred to as a polymer electrolyte membrane), an oxidant inlet port 112, a cathode 114, and an exhaust output port 116. A housing 124 can enclose the fuel cell and define an anodic chamber 116 and cathodic chamber 118. During operation of the fuel cell 100, a reactant can be pumped into the reactant inlet port 102 causing it to come into contact with the anode 104 within an anodic chamber 116. At the anode 104, a catalytic reaction can occur when the reactant comes into contact with a catalyst to convert the reactant into hydrogen ions (that is, protons) and electrons. When the reactant is hydrogen gas for example, the hydrogen can fully or partially disassociate into hydrogen ions and electrons in the presence of the catalyst. Any unreacted hydrogen can be output through the outlet port 106. The catalyst can be individual particles of platinum, iron, or palladium (including, for example, nano-powders). They can be suspended on a carbon support structure, carbon nanotubes, or plates of metal such as nickel, for example as described in further detail below. In some fuel cells a sheet of carbon paper separates the anode/catalyst from the PEM. The dissociated hydrogen ions can flow through the PEM 108 and the electrons can flow through the load circuit 110. For example, electrons at the anode can be collected by an anode electrical connection 120, delivered to a load circuit 110 coupled to the fuel cell 100, and then returned to the cathode by a cathode electrical connection 122.

An oxidant, such as air, can be pumped into the oxidant inlet port 112 into the cathodic chamber 118 and toward the cathode 114. At the cathode 114, the hydrogen ions flowing from the PEM 108 and the electrons flowing from the load circuit 110 can interact with the oxidant in the presence of a catalyst to form, for example water. The PEM 108 can be designed to conduct hydrogen ions but not permit gasses from the cathode side of the fuel cell to cross back toward the anode. Typically the PEM 108 can be designed to withstand the catalytic oxidative environment at the anode side as well as the reducing environment at the cathode side. One type of PEM is Nafion material available from DuPont. In some embodiments the PEM can be a ceramic. The reactions for a hydrogen fuels can be expressed by the following:

Anode: $H_2 \rightarrow 2H^+ 2e^-$

Cathode: $\frac{1}{2}O_2 + 2H^+ + 2e^- \rightarrow H2O$

Overall: $H_2 + \frac{1}{2}O_2 \rightarrow H_2O$

In addition to hydrogen fuel cells, many types of fuels and oxidants can be used. For example, the fuels input can be hydrocarbon fuels such as diesel, methanol and chemical hydrides, and the oxidants can include air, oxygen, chlorine, and chlorine dioxide, for example. When the input to the fuel cell 100 is liquid methanol ($CH_3OH$), this type of fuel can be known as a direct methanol fuel cell (DMFC). In a DMFC, the methanol is oxidized in the presence of water at the anode generating, in addition to the hydrogen ions and electrons, carbon dioxide ($CO_2$). The $CO_2$ can be directed out the outlet port 106. Methanol can be useful because it remains a liquid through a large temperature range and can contribute a higher density of hydrogen ions and electrons per unit reaction. One disadvantage of using methanol in high concentrations is that it can have a tendency to diffuse through the PEM to the cathode. Therefore, diluted methanol can be used but can result in a lower maximum possible current. Another challenge of DFMCs is having to manage carbon monoxide produced at the anode which can be formed during the methanol oxidation. Carbon monoxide produced at the anode can strongly adsorb on to the platinum catalyst thereby reducing the amount of platinum available for the dissociation of hydrogen ions and electrons. One technique for addressing the presence of the carbon monoxide is the introduction of ruthenium and/or gold catalyst particles which can reduce the issue. It is believed that this is accomplished by these catalysts oxidizing water to yield OH radicals which in turn oxidize carbon monoxide to produce carbon dioxide.

The reactions for a direct methanol fuel cell without the OH groups can be expressed by the following:

Anode: $CH_3OH + H_2O \rightarrow 6H^+ + 6e^- + CO_2$

Cathode: $3/2 O_2 + 6H^+ + 6e^- \rightarrow 3H_2O$

Overall: $CH_3OH + 3/2 O_2 \rightarrow 2H_2O + CO_2$

The reactions for a direct methanol fuel cell with the OH groups can be expressed by the following, if one considers that the catalysts can oxidize $H_2O$ to yield OH radicals: $H_2O \rightarrow OH\bullet + H^+ + e^-$. The OH species can oxidize CO to produce $CO_2$ which can then be generated as a gas: $CO + OH\bullet \rightarrow CO_2 + H^+ + e^-$:

Anode: $CH_3OH + 6OH^- \rightarrow 5H_2O + 6e^- + CO_2$

Cathode: $3/2 O_2 + 6H^+ + 6e^- \rightarrow 6OH^-$

Overall: $CH_3OH + 3/2 O_2 \rightarrow 2H_2O + CO_2$

Figure 2:
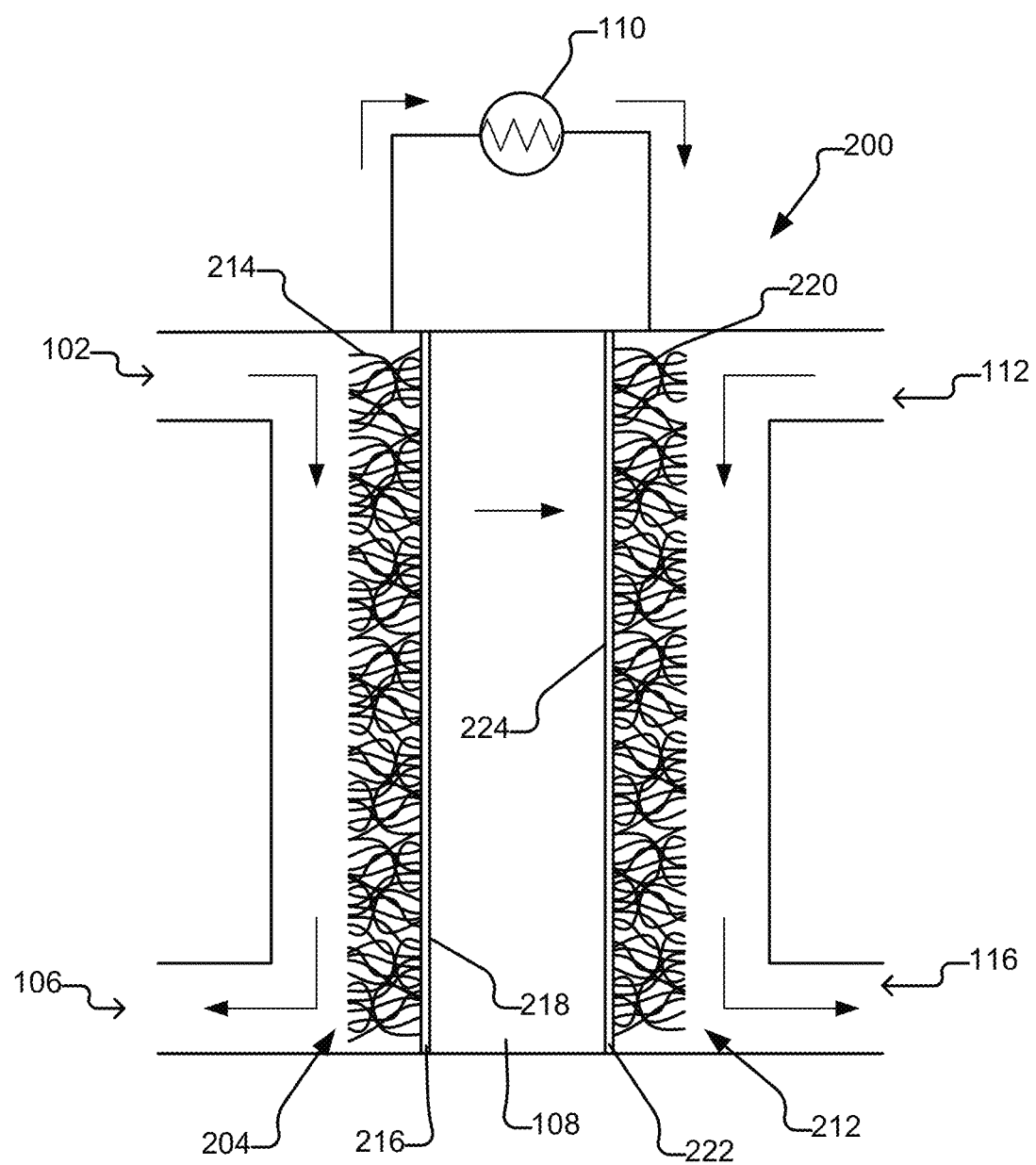
FIG. 2 illustrates an example of a hydrogen fuel cell using carbon nanotubes according to some embodiments of the invention.

FIG. 2 illustrates a hydrogen fuel cell 200 according to some embodiments of the invention. Fuel cell 200 can be similar to fuel cell 100 where like items are referenced using reference numerals of FIG. 1. Fuel cell 200 can contain anode 204 and cathode 212. Anode 204 can comprise a catalyst layer 214. Catalyst layer 214 can comprise a layer of a plurality of carbon nanotubes in which the nanotubes can be generally aligned in the same direction, although some of the carbon nanotubes in the group can overlap, be comingled or intertwined, or otherwise contact one or more other carbon nanotubes in one or more places. Also, in some embodiments, not all of the carbon nanotubes in a column need extend the entire length of the layer. In some embodiments, the catalyst layer 214 can include a porous support substrate 216 from which the carbon nanotubes extend. The catalyst layer 214 can be disposed adjacent to or in direct contact with PEM 108. In some embodiments the support substrate 216 can be disposed in contact with PEM 108. In some embodiments the catalyst layer 214 can be partially integrated into a surface 218 of the PEM by hot pressing without or without the support substrate 216. Cathode 212 can be similar to any of the variations mentioned with respect to anode 204. Accordingly, cathode 212 can include a catalyst layer 220, which can include a layer of generally aligned carbon nanotubes, which can extend from a support substrate 222 and be adjacent and/or partially integrated into a surface 224 of PEM 108. In some embodiments cathode 212 can be of the same variation as anode 204 and in some embodiments cathode 212 can comprise a different variation of the type described above with reference to anode 204. Although shown as extending in a single direction from support substrates 216 and 222, the catalyst layer 218 could extend from both directions.

Figure 3:
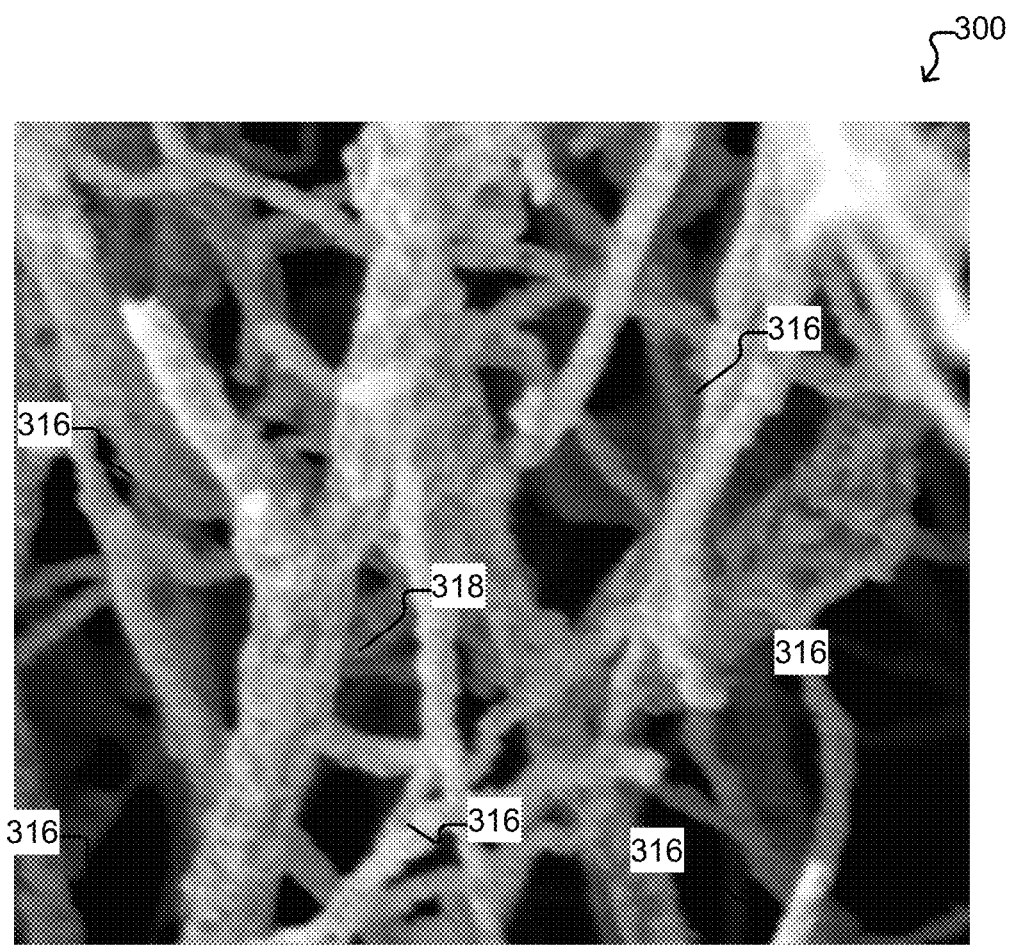
FIG. 3 shows a photograph of an example of a portion of a layer of carbon nanotubes coated with a catalyst according to some embodiments of the invention.

FIG. 3 illustrates a photograph of a portion of catalyst layer 300, which can be an example of catalyst layer 214, 220, comprising individual carbon nanotubes 316, a few of which are labeled. The carbon nanotubes can be coated with particles or layers of material. For example, the carbon nanotubes can be loaded with a catalyst material (e.g., platinum, ruthenium, gold, or combinations thereof. As another example, the carbon nanotubes can be loaded with an electron conductor (e.g., a metal), a proton conductor (e.g., an ionomer), or both. For example, Nafion material from Dupont is an example of an ionomer which can be used as a proton conductor. Particles of Nafion material can be loaded into the carbon nanotubes. For example, grown carbon nanotubes can be pressed into a sheet of Nafion material.

Individual carbon nanotubes can be coated with a layer of catalyst 318 such as platinum, platinum alloys, ruthenium, gold or combinations thereof. In some embodiments of the invention the catalyst 318 can comprise a substantially uniform coating on the individual carbon nanotubes 316, or discrete catalyst particles. In some embodiments, individual carbon nanotubes 316 can be coated in entirely along their length with catalyst 318. When individual carbon nanotubes are substantially coated by catalyst 318, the primary path of electron conduction can be through the catalyst layer rather than via the carbon nanotube itself. In some embodiments, the catalyst layer 300 has all or substantially all of the individual carbon nanotubes 316 coated with catalyst 318. For ease of illustration, only one carbon nanotube 316 is labeled with catalyst 318. In some embodiments, as a result of the coating of the carbon nanotubes 316 throughout the catalyst layer 300, the catalyst efficiency can be greater than or equal to 50% based on a ratio of catalyst surface to conduction paths. In some embodiments, this efficiency can be greater than or equal to 80%, in some embodiments, greater than or equal to 90%, in some embodiments greater than or equal to 95%, and in some embodiments can be greater than or equal to 99%, and in some embodiments equal to approximately 100%.

Figure 4:
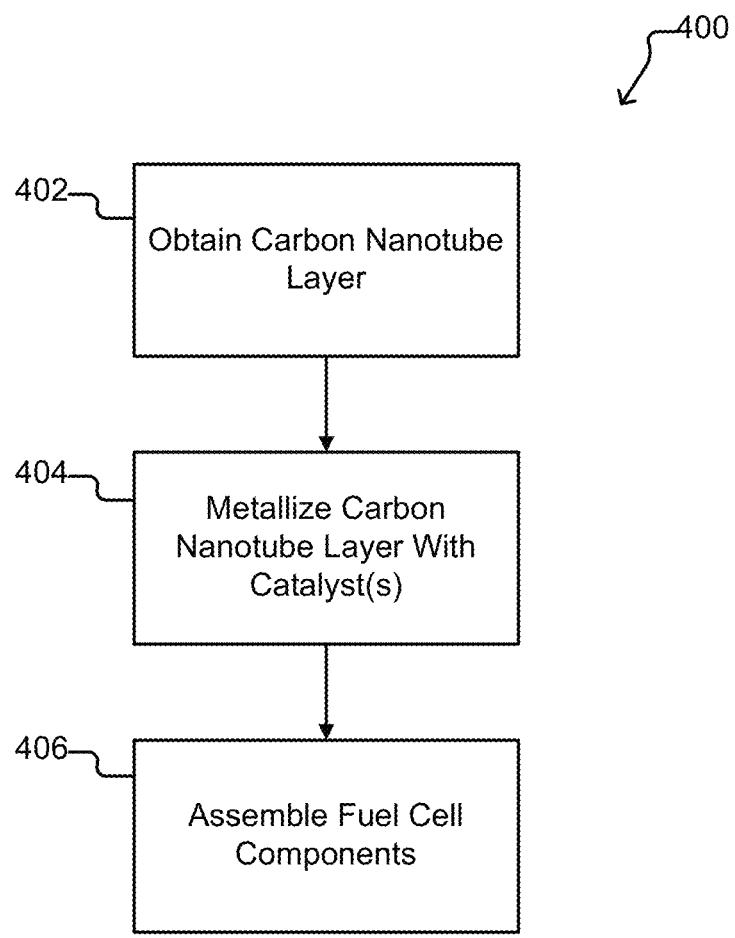
FIG. 4 illustrates an example process for creating a fuel cell according to some embodiments of the invention.

FIG. 4 illustrates an example process for creating a fuel cell 200 according to some embodiments of the invention. As shown in FIG. 4, a carbon nanotube layer can be obtained at step 402. For example, a carbon nanotube layer can be grown as described in further detail below. The carbon nanotube layer can be metalized with one or more catalysts at step 404. For example, metallization can be performed as described in further detail below. The fuel cell components can then be assembled at step 406. For example, an anode and cathode can be constructed at steps 402 and 404, and the anode and cathode assembled with a proton exchange membrane to form a fuel cell.

Figure 5:
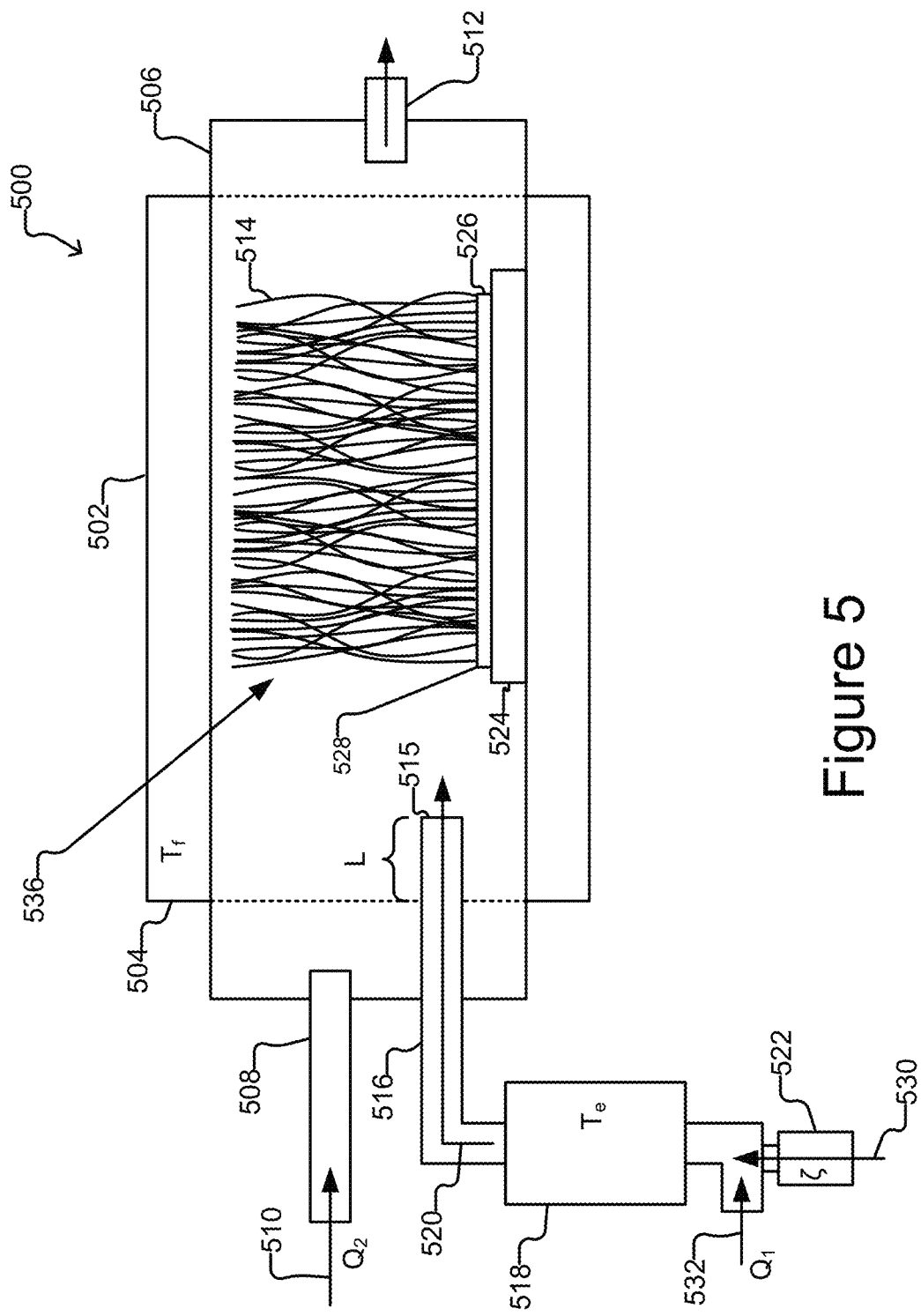
FIG. 5 illustrates a system for growing carbon nanotubes according to some embodiments of the invention.

FIG. 5 illustrates a growth system 500 in which a layer 536 of carbon nanotubes 514 can be grown (for ease of illustration only one carbon nanotube 514 is labeled). Although for convenience and ease of discussion the growth system 500 is discussed below with regard to growing columns 514 on a surface 528 of a growth material 526 of a growth substrate 524, the growth system 500 is not so limited but can be used to grow other carbon nanotube columns on other growth substrates.

As shown in FIG. 5, the growth system 500 can comprise a chamber 506 in which the growth substrate 524 can be placed (initially without carbon nanotubes 514). As shown, a temperature control device 502 (e.g., a heater and/or cooling device) can be provided for controlling the temperature ($T_f$) of the chamber 506. As also shown, one or more inlet tubes 508, 516 can be provided into the chamber 506, and one or more outlet tubes 512 can be provided out of the chamber 506. (Although two inlet tubes 508, 516 are shown and one outlet tube 512 is shown, more or fewer inlet tubes and/or more outlet tubes 512 can alternatively be provided.) In some embodiments, an end 515 of inlet tube 516 can be positioned inside the chamber 506 a length L from an edge 504 of the temperature control device 502 as shown in FIG. 5.

An injection device 522 (e.g., a syringe or pump) can be provided to introduce a growth solution 530 into a carrier gas 532 near the input to or inside an evaporator 518, which can vaporize the growth solution 530 to enhance mixing with the carrier gas 532. From the evaporator 518, the mixture 520 of the growth solution 530 and the carrier gas 532 can be passed through the inlet tube 516 into the chamber 506 as shown. The mixture of the growth solution 530 and the carrier gas 532 can be referred to as a growth gas 520. As also shown, in some embodiments, another carrier gas 510 can be provided through another inlet tube 508 into the chamber 502. The other carrier gas 510 can be the same as or different than the carrier gas 532. One or more pumps (not shown) can be provided to pump the gases 532 and 510.

The growth system 500 can be used as follows. Initially, the growth substrate 524 can be prepared. The growth substrate 524 can be any structure suitable for supporting the carbon nanotubes 514 as the carbon nanotubes 514 grow. Non-limiting examples of a suitable growth substrate 524 include a semiconductor wafer, a ceramic substrate, a substrate comprising an organic material, a substrate comprising an inorganic material, or any combinations thereof. Growth material 526 can be deposited on the substrate 524 in locations where it is desired that carbon nanotube columns 514 are grown. Each deposit of growth material 526 can be patterned in a desired shape. The growth material 526 can be patterned in any suitable manner. For example, the growth material 526 can be deposited on the substrate 524 in the desired pattern of the growth material 526. Alternatively, the growth material 526 can be deposited on the substrate 524 and then portions of the growth material 526 can be selectively removed, leaving growth material 526 on the substrate 524 in the desired pattern. As yet another alternative, the growth material 526 can be deposited on the substrate 524 and then portions of the growth material 526 can be selectively covered, leaving growth material 526 on the substrate 524 exposed in the desired pattern. As still another alternative, the growth material 526 can be deposited on the substrate 524, then portions of the growth material 526 can be covered, and then portions of the covering can be selectively removed, leaving growth material 526 on the substrate 524 exposed in the desired pattern.

The pattern of the growth material 526—or more specifically, the pattern of the growth surface 528—can correspond to a desired pattern of the catalyst layer 214 or 220. In other embodiments the pattern need not correspond to the desired pattern of the catalyst layer 214, 220. For example, the pattern may be smaller than the catalyst layer 214, 200 and the smaller units can be assembled to create a larger layer, or the pattern may be larger than the desired size and undesired carbon nanotubes discarded by removal, or cut into desired sizes. In some embodiments the growth substrate 524 and/or growth material 526 can be supported substrate 216, 222.

The growth material 526 can be any suitable material with a surface 528 that comprises or can be formed to comprise a material on which carbon nanotubes can be grown when exposed to the growth solution 530. For example, the growth material 526 can comprise silicon, and the surfaces 528 of the growth material 526 can comprise an oxide film. In some embodiments, the growth substrate 524 or at least an upper surface of the growth substrate 524 can comprise growth material like growth material 524 with a growth surface like surface 528 in which case growth material 526 need not be disposed on the growth substrate 524. In such a case, the growth substrate 524 can be the growth material 526. After the growth substrate 524 is prepared, the growth substrate 524 (without the carbon nanotubes 514) can be placed into the chamber 306 as illustrated in FIG. 5. In some embodiments growth substrate 524 and/or growth material 526 can be porous aluminum, aluminum oxide, stainless steel, or other porous material that can permit passage of the hydrogen into or out of the PEM 108. In some embodiments the growth substrate 524 and/or growth material 526 can be treated after carbon nanotube growth to create or increase porosity. In some embodiments, the carbon nanotubes 514 can be grown on the growth substrate 524 and/or growth material 526 and transferred to another support substrate, such as support substrate 216 and/or 222.

The temperature control device 502 can be utilized to bring the chamber 506 to a desired temperature $T_f$. The growth solution 530 can be introduced into the carrier gas 532 and provided through the evaporator 518 and the inlet tube 516 into the chamber 506 as a growth gas. The evaporator 518 can be set to a desired temperature $T_e$ (e.g., sufficient to vaporize the growth solution 530). In introducing the growth solution 530 into the carrier gas 532, the carrier gas 532 can be provided at a flow rate $Q_1$, and the growth solution 530 can be provided at a pump rate $\zeta$. A carrier gas 532 can also be provided through the inlet tube 508 into the chamber 506, and the carrier gas 510 can be provided at a flow rate $Q_2$.

The material or materials of the growth solution 530 can be any suitable material or materials suitable for growing carbon nanotubes on the surfaces 528 of the growth material 526. In some embodiments, the growth solution 530 can comprise a source of carbon, and the growth material 526 can comprise a catalyst. In some embodiments, the growth solution 530 can comprise a source of carbon and a catalyst. The catalyst can be any suitable material that causes the carbon in the source of carbon to react with the surfaces 528 of the growth material 526 to grow carbon nanotubes 514 from the surfaces 528. A non-limiting example of a suitable catalyst is an iron metalorganic material (e.g., ferrocene). Other examples of suitable catalysts include nickel or cobalt metallorganic materials, zirconium oxide, ferroceneacetic acid, ferroceneacetonitrile, ferrocenecarboxaldehyde, ferrocenecarboxylic acid, ferrocenedicarboxaldehyde, and ferrocenedicarboxylic acid. The source of carbon can be any suitable material that provides carbon to grow as carbon nanotubes on the surfaces 528 of the growth material 526. Non-limiting examples of a suitable source of carbon is a liquid hydrocarbon source (e.g., xylene), aromatic hydrocarbons (e.g., benzene, toluene, xylene, styrene, ethylbenzene and all alkylated benzene, cyclopentadiene), ethylene, and methane. If the catalyst or the source of carbon is a gas, the system 500 can be modified to accommodate the catalyst or source of carbon as a gas.

The material or materials of the carrier gas 532 can be any suitable gas or gases suitable for carrying the growth solution 530 into the chamber 506. In some embodiments, the carrier gas 532 can comprise a carrier, a support gas, and air. Non-limiting examples of a suitable carrier include argon gas or nitrogen gas, and non-limiting examples of a suitable support gas include hydrogen gas ($H_2$) and water vapor. The carrier gas 532 can be the same as or different than the carrier gas 510. The foregoing materials are examples only, and other materials can comprise the growth solution 530 and the carrier gases 510 and 532.

The concentrations of the materials that comprise the growth solution 530 and the carrier gases 510 and 532, the temperatures $T_f$ and $T_e$ of the chamber 506 and the evaporator 518, respectively, the pump rate $\zeta$ of the growth solution 530, the flow rates $Q_1$ and $Q_2$ of the carrier gases 530 and 510, the length L of the end 515 of the inlet tube 516 from the edge 504 of the temperature control device 502, the time "t" over which the carbon nanotubes are grown from the surfaces 528 of the growth material 526, and other parameters can be selected as desired to grow the carbon nanotubes on the surfaces 528 of the growth material 526. By way of example but not limitation, the following are suitable values for the foregoing:

carrier gas 510 composition:
$H_2$/argon ratio: 0 to 0.5;
carrier gas 532 composition:
$H_2$/argon ratio: 0 to 0.5;
air: 0-20 standard cubic centimeters per minute (sccm);
growth solution 530 concentration:
concentration of ferrocene in xylene: 0.0004-0.05 grams per milliliter;
temperature $T_f$ of chamber 506: 700-850 degrees Celsius;
temperature $T_e$ of evaporator 518: 105-250 degrees Celsius;
pump rate $\zeta$ of the growth solution 530: 2-18 milliliters per hour (ml/h);
flow rate $Q_1$ of the carrier gas 532: 50-500 sccm;
flow rate $Q_2$ of the carrier gas 510: 0-200 sccm;
time "t" the carbon nanotubes are grown: 1-180 minutes;
length "L" from the edge 504 of the temperature control device 502 to the end 515 of the inlet tube 516: 8-26 centimeters.

Referring again to the process 400 of FIG. 4, carbon nanotubes 514 can be provided at 402 by growing as discussed above with FIG. 5. Alternatively, the carbon nanotubes 514 can be obtained in other ways. For example, the growth substrate 524 can be obtained with the columns 514 already grown from the growth material 526.

Regardless of how the layer 536 of carbon nanotubes 514 is obtained at step 402, the carbon nanotubes 514 can be metalized at step 404 to provide an anode or cathode structure. As mentioned above, the carbon nanotubes 514 can be metalized to provide additional electrical conductivity and/or current carrying capability of the layer 536. The carbon nanotubes 514 can be metalized with fuel cell catalysts, for example, platinum, platinum alloys, ruthenium, gold or combinations thereof. In some embodiments, some, almost all, or all of the carbon nanotubes 514 in the layer 536 can be metalized. The metalized layer 536 can be an example of catalyst layer 300.

Methods that deposit the metal on carbon nanotubes 514 inside the layer 536 can be advantageous in certain embodiments, although the invention is not so limited. Some methods are not advantageous for uniformly depositing metal throughout the layer 536. Electroplating, for example, can plate a layer of metal on the layer 536 but not penetrate throughout the layer 536 and coat each individual carbon nanotubes 514. Prior methods, such as solution impregnation and precipitation, of applying metal to carbon nanotubes deposit particles of metal leaving portions of the carbon nanotubes having no metal at all. Such prior methods suffer from decreased electron flow because a portion of the electron flow is through the carbon nanotube itself. Atomic layer deposition (ALD), for example, can be particularly advantageous for uniformly depositing metal on each of the carbon nanotubes 514. However, the inventors are not aware of any prior method that has successfully and uniformly metalized individual columns 514 throughout the entire layer 536 where the layer 536 has a high aspect ratio required for penetration of the precursor gases. This uniform metallization of individual carbon nanotubes, both each individual carbon nanotubes and/or throughout the entire layer itself, can advantageously increase the per unit area of catalyst available for reaction as well as make the primary path for electron transport be the metallization.

Figure 6:
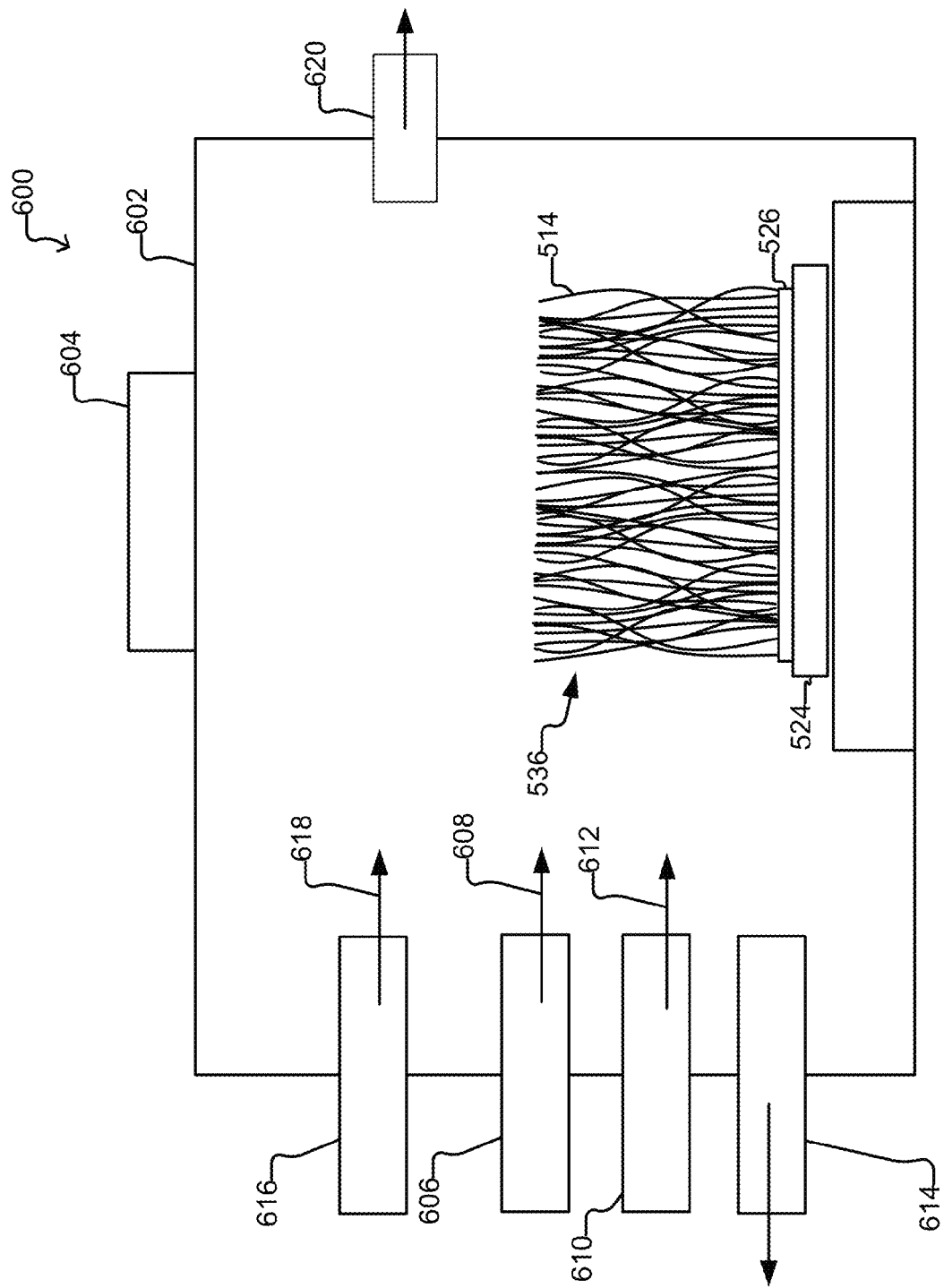
FIG. 6 illustrates an example of a system for metalizing carbon nanotubes according to some embodiments of the invention.
Figure 7:
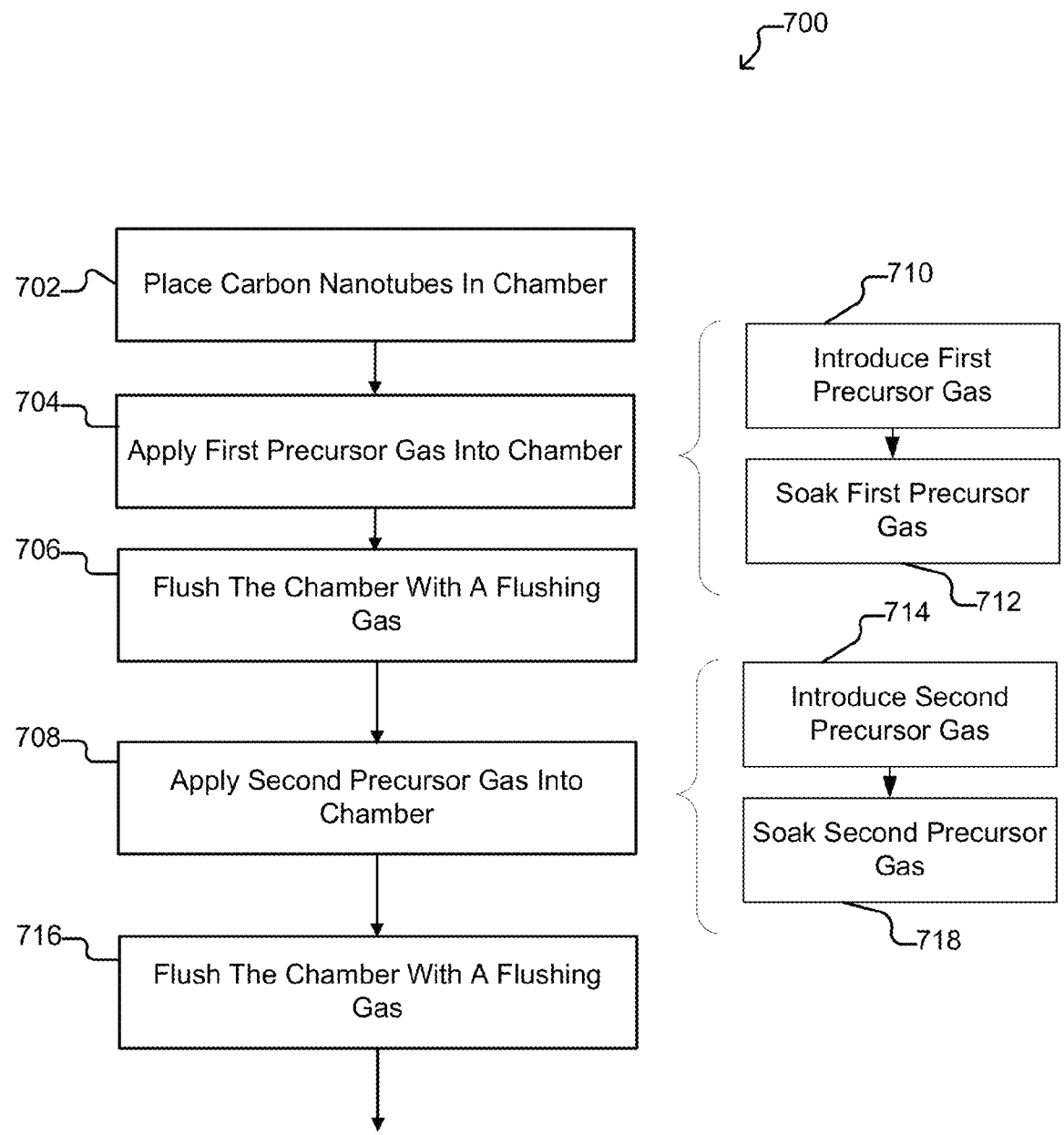
FIG. 7 illustrates an example process for metalizing carbon nanotubes according to some embodiments of the invention.

FIG. 6 illustrates a metalizing system 600, and FIG. 7 illustrates a process 700 of utilizing the system 600 to metalize the columns 514 of layer 536 obtained at step 402 of FIG. 4 in which metal catalyst 318 can be deposited on each carbon nanotube 514 throughout layer 536 using ALD.

As shown in FIG. 6, the metalizing system 600 can comprise a chamber 602 and a temperature control device 604 (e.g., a heater and/or a cooling device) that can control the temperature inside the chamber 602. The temperature control device 604 can comprise an inductive heater, and the chamber can be non-electrically conductive. For example, the chamber 602 can comprise glass plates. One or more inlet ports 606,

610 and 616 (three are shown but fewer or more can be included) can provide means by which materials (e.g., gases 608, 612, and 618) can be introduced into the chamber 602. The system 600 can also include a vacuum pump 614 by which the chamber 602 can be evacuated, and can include an outlet port 620.

In some embodiments, the temperature control device 602 can be used to maintain a temperature for reactions within the chamber 602. In some embodiments, the temperature can be room temperature, and in some embodiments the temperature can be within a range of 20 to 400 degrees Celsius. In some embodiments, the temperature can be greater than or equal to a temperature at which a surface reaction begins to occur between the precursor gas and the surface on which to deposit and less than a temperature at which the precursor gas decomposes before reaching the surface.

The system 600 of FIG. 6 can be used to metalize the carbon nanotubes 514 using ALD at step 702 of FIG. 7. This can include initially placing the growth substrate 524 into the chamber 602. At step 704 of FIG. 7, a first precursor gas 608 can be applied through the inlet port 606 into the chamber 602 as shown in FIG. 6. The first precursor gas 608 can comprise a monomer gas whose molecules have a high affinity to the carbon of the carbon nanotubes 514 and/or create a monomer layer surrounding the carbon nanotubes 514, and/or a surface to be coated. In some embodiments, the first precursor gas 608 can be (Trimethyl)methylcyclopentadienylplatinum (IV), and the chemical formula is (CH3)3(CH3C5H4)Pt for deposition of platinum. For ruthenium, the precursor can be a volatile Ru amidinate precursor, for example, Ru(Bu-Me-amd)$_2$(CO)$_2$ The first precursor gas 608 can be introduced and maintained in the chamber 602 under sufficient pressure and for a sufficient period of time to cause the first precursor gas 608 to thoroughly penetrate the layer 532 and thus surround the carbon nanotubes 514. One non-limiting way of doing so is as follows: evacuate the chamber 602 using the vacuum pump 614, and introduce the first precursor gas 608 through the inlet port 606. In some embodiments, the first precursor gas can be pulsed. In some embodiments, the pressure that can be within an inclusive 0 to 500 Ton, in some embodiments the pressure can be within an inclusive 0.2 to 300 Torr, and in some embodiments the pressure can be within an inclusive 0.2 to 100 Torr, and in some embodiments the pressure can be within an inclusive range of 0.2 to 50 Torr. The foregoing pressure range is an example only, and the invention is not so limited. The period of time that the first precursor gas 608 can surround the carbon nanotubes 514 can be within the inclusive range of 0.1 seconds to 1 hour, in some embodiments within an inclusive range of 0.1 second to 30 minutes, and in some embodiments within an inclusive range of 0.1 second to 12 minutes. In some embodiments, the first precursor gas can be pulled into the growth chamber 602 along with a second gas, such as nitrogen, argon and/or helium which acts as a carrier gas.

In some embodiments, the application of the first precursor gas can include two phases, an introduction phase 710 and a soak phase 712. In the introduction phase the first precursor gas can be introduced, with or without a second gas such as nitrogen, for an initial time period at an initial pressure. In some embodiments the initial time period can be within the inclusive range of 0.001 seconds to 30 minutes, in some embodiments within an inclusive range of 0.01 second to 10 minutes, in some embodiments within an inclusive range of 0.1 second to 5 minutes, in some embodiments within an inclusive range of 0.1 second to 1 minute, in some embodiments within an inclusive range of 0.1 second to 30 seconds, in some embodiments within an inclusive range of 0.1 second to 20 seconds, and in some embodiments within an inclusive range of 0.1 second to 10 seconds. In some embodiments, the initial time period can depend on the size of the chamber, and/or the volume of the layer to be metalized. In some embodiments, the chamber 602 can be set to an initial pressure or maintained at an initial phase pressure. In some embodiments, the initial phase pressure can be within an inclusive 0 to 500 Torr, in some embodiments the pressure can be within an inclusive 0 to 100 Torr, and in some embodiments the pressure can be within an inclusive 0.2 to 50 Torr, in some embodiments the pressure can be within an inclusive range of 0.2 to 10 Torr, in some embodiments the pressure can be within an inclusive range of 0.2 to 1 Torr, in some embodiments the pressure can be within an inclusive range of 0.2 to 0.5 Torr, in some embodiments the pressure can be within an inclusive range of 0.1 to 0.2 Torr. In some embodiments, the initial phase pressure period can depend on the size of the chamber. The times and pressures mentioned above are non-limiting.

In the soak phase 712, in some embodiments, the first precursor can be stopped. In some embodiments where a second gas accompanies the first precursor gas, the first precursor gas can be stopped but the second gas continued, or, if no second gas accompanied the first precursor gas, a second gas can be started during the soak phase, although it is not required. In some embodiments the soak phase time period can be within the inclusive range of 0.1 seconds to 1 hour, in some embodiments within an inclusive range of 0.1 second to 30 minutes, in some embodiments within an inclusive range of 0.1 second to 20 minutes, in some embodiments within an inclusive range of 0.1 second to 10 minutes. In some embodiments, the initial time period can depend on the size of the chamber, and/or the volume of the layer to be metalized, and/or a combination of the height and size of the layer to be metalized. In some embodiments, the chamber 602 can be set to a soak phase pressure or maintained at a soak phase pressure during the soak phase. In some embodiments, the soak phase pressure that can be within an inclusive 0 to 1000 Torr, in some embodiments the pressure can be within an inclusive 0 to 500 Torr, and in some embodiments the pressure can be within an inclusive 0.2 to 100 Torr, and in some embodiments the pressure can be within an inclusive range of 0.2 to 50 Torr. In some embodiments, the soak pressure begin at the pressure existing at the end of the introduction of the precursor gas and continue to increase as the second, carrier gas continues to be pumped into the chamber 506. In some embodiments the second gas flow can be maintained until the soak pressure reaches a desired pressure. In some embodiments, the time period of the soak phase can be greater than or equal to the initial time phase. In some embodiments, the soak phase time period can be greater than or equal to the initial phase pressure. The soak phase time period and soak phase pressures are non-limiting.

At step 706 of FIG. 7, the chamber 602 can be flushed with a flushing gas. In some embodiments, where the first precursor gas can be accompanied by a second gas, the first precursor gas can be stopped and the second gas continued as the flushing gas. In other embodiments, the flushing can take place after, for example the soak phase. For example, a flushing gas 612 can be introduced into the chamber 602 through the inlet port 610 and removed from the chamber 602 by the vacuum pump 614. The flushing gas 612 can be a gas that does not react appreciably with the carbon nanotubes 514 and/or the first precursor gas. Examples of a suitable flushing gas 612 can include nitrogen, argon, and/or helium. In some embodiments, the second, carrier gas can be the same as the flushing gas. The flushing time period can be of a range similar to the ranges described above with respect to the soak phase time period, though it is not so limited. The flushing pressure can be of a range similar to the ranges described above with respect to the ranges described above with respect to the initial phase, though it is not so limited. In some embodiments, the flush pressure can be less than or equal to the soak phase pressure.

At step 708 of FIG. 7, a second precursor gas 618 can be applied using inlet port 616 as shown in FIG. 6. The second precursor gas 618 can have a high affinity to the first precursor gas 608 on the carbon nanotubes 514 and react such that an atomic layer of the desired catalyst 318 is left on the carbon nanotube 514. In some embodiments, the second precursor gas 618 can comprise water vapor. The second precursor gas 618 can be introduced under a pressure of similar to the pressures described above to the first precursor gas, although it is not so limited. The period of time that the second precursor gas 618 can surround the carbon nanotubes 514 having the first precursor gas can be similar to the time described above with respect to the first precursor gas, although it is not so limited. In some embodiments, the introduction of the second precursor gas can comprise an initial phase and a soak phase as described above with respect to the first precursor gas as it related to the times and pressures. In some embodiments, the application of the second precursor gas 708 can include the steps of introducing the second precursor gas 714 and soaking the second precursor gas 718. Steps 714 and 718 can be similar to steps 710 and 712 except for the precursor gas. At step 716 the chamber can be flushed with a flushing gas.

Because ALD is a self limiting process on the surface of the carbon nanotubes 514 for successive layers of deposition, the disposition (thickness and/or amount) of the catalyst can be carefully controlled. Steps 704 through 708 of a first precursor gas and second precursor gas sequence can be repeated until a desired thickness of catalyst is deposited on the carbon nanotubes 514. In some embodiments the first precursor gas and second precursor gas sequence can be repeated until all or substantially all of the carbon nanotubes 514 are encased in the catalyst. In some embodiments, a third precursor gas and fourth precursor gas in sequence can be used to deposit a different catalyst using the same techniques for applying the first and second precursor gasses. In some embodiments one or more third precursor gas and forth precursor sequences gas can follow and/or alternate with one or more first precursor gas and second precursor gas sequences. For example, the first precursor gas and second precursor gas sequence can result in a disposition of platinum and the third precursor gas and forth precursor sequence gas can result in a deposition of ruthenium. In some embodiments the first precursor gas and second precursor gas sequence and/or third precursor gas and forth precursor sequence can be repeated until all or substantially all of the carbon nanotubes 514 are encased in the catalyst coating, where the catalyst coating can comprise one or more catalysts. In some embodiments, this can be done so that a penetration of the layer 536 is greater than or equal to 50%, in some embodiments greater than or equal to 80%, in some embodiments greater than or equal to 90%, in some embodiments greater than or equal to 99%, and in some embodiments approximately 100%.

In some embodiments, the layer 536 can have an aspect penetration ratio greater or equal to 10, in some embodiments greater than or equal to 100, and in some embodiments greater than or equal to 1000. In some embodiments, the height of the layer 536 can be greater than or equal to 10 microns, in some embodiments greater than or equal to 25 microns, in some embodiments greater than or equal to 50 microns, in some embodiments greater than or equal to 75 microns, in some embodiments greater than or equal to 100 microns. In some embodiments, the layer 536 can have an area dimension of 10 mm×10 mm In some embodiments, the area dimension can be larger. In some embodiments, the steps of FIG. 7 can provide for a desired ALD penetration depth into the carbon nanotube layer 536, including for example, full penetration into the layer. In some embodiments, the aspect penetration ration can mean the depth of penetration of the precursor gas divided by the average gap between the tubes through which the precursor gas travels.

In some embodiments, during iterations of the process 700 the catalyst 318 can be deposited on each carbon nanotube 514 uniformly throughout layer 536, which can avoid problems arising from catalyst 318 deposits on outside of the layer 536 impeding the flow of the precursor gases into the inside of the layer 536.

Figure 8:
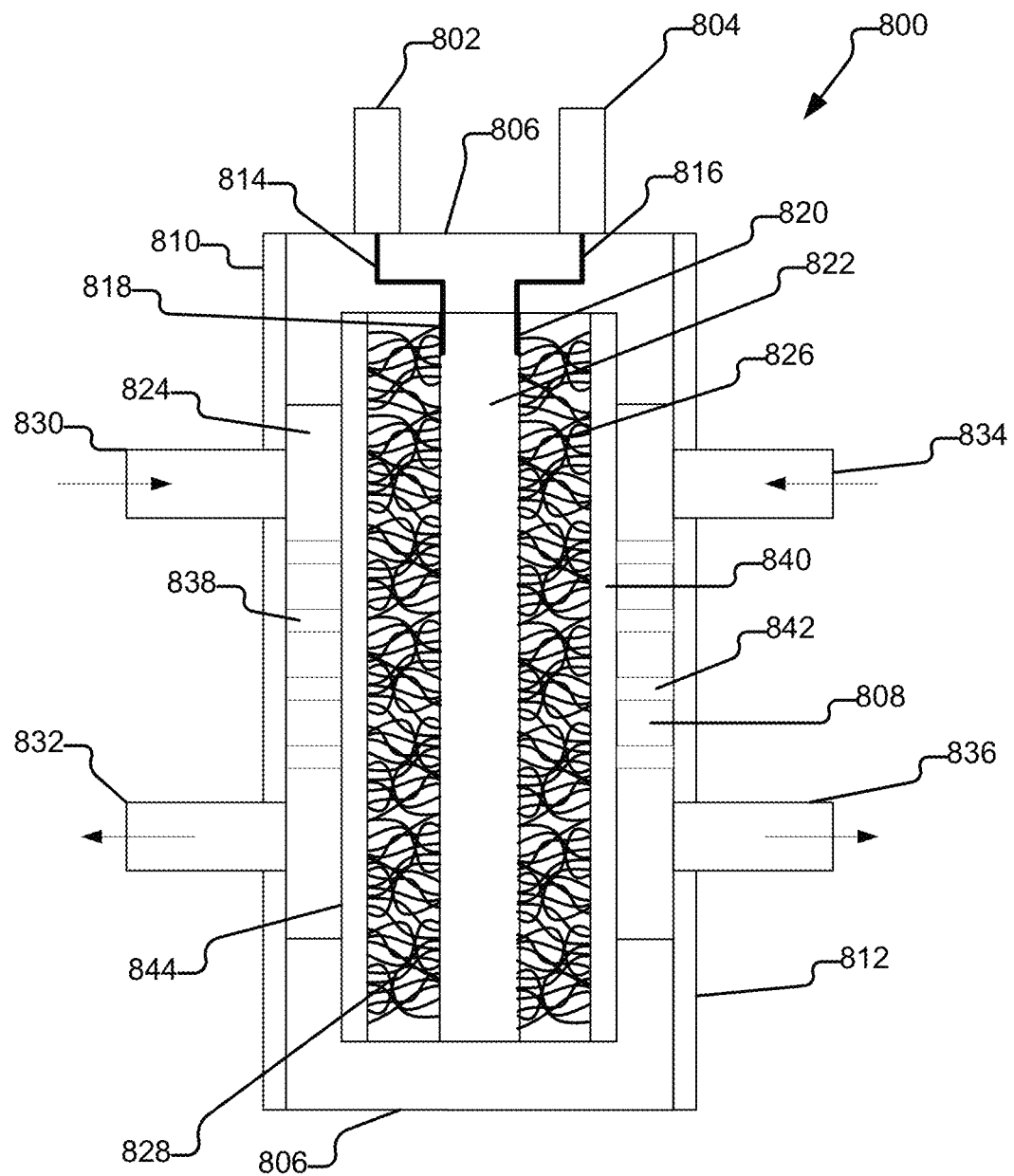
FIG. 8 illustrates a hydrogen fuel cell according to some embodiments of the invention.

FIG. 8 illustrates a hydrogen fuel cell 800 according to some embodiments of the invention. Fuel cell 800 can include an anode connector 802, a cathode connector 804, a housing 806, cathode cavity 808, an anode cover 810, a cathode cover 812, anode wiring 814, cathode wiring 816, anode wiring layer 818, cathode wiring layer 820, PEM 822, anode cavity 824, cathode layer 826, anode layer 828, anode inlet 830, anode outlet 832, cathode inlet 834, cathode outlet 836, baffle 838, cathode substrate 840, baffle 842, and anode substrate 844. Anode connector 802 and cathode connector 804 can be electrical connectors to which to apply the load for the fuel cell 800. Anode wiring 814 can extend through housing 806 connecting the anode connector 802 to anode wiring layer 818. Anode wiring layer 818 and cathode wiring layer 820 can comprise a wiring layer patterned on, respectively anode layer 828 and cathode layer 826, and can comprise, for example, titanium/gold metal. Anode wiring 814, anode wiring layer 818, and anode connector 802 can thus be examples of an anode electrical connection. Cathode wiring 816, cathode wiring layer 820, and cathode connector 804 can thus be examples of a cathode electrical connection. The anode layer 828 can be similar to catalyst layer 214, catalyst layer 300, and catalyst layer 536. The cathode layer can be similar to catalyst layer 220, catalyst layer 300, and catalyst layer 536. Anode layer 828 and cathode layer 826 can comprise an interconnected mesh of carbon nanotubes fully metalized with a desired catalyst such as those motioned above. The anode layer 828 and cathode layer 826 can be metalized using the ALD processes described above. Housing 806 can serve to contain the anode substrate 844, anode layer 828, anode wiring layer 818, PEM 822, cathode wiring layer 820, cathode layer 826, and cathode substrate 840. Housing 806 can comprise any number of non conducting materials such as ceramic. Anode cover 810 and cathode cover 812 can create, respectively, anode cavity 824 and cathode cavity 808 where the respective catalytic reactions occur. For example, hydrogen can be input into anode inlet 830 where it diffuses around baffles 838 and through anode substrate 844, which can be porous, to interact with the catalyst in the anode layer 828 to produce hydrogen ions and electrons. Any waste products can pass through anode outlet 832. The electrons can travel through the metalized carbon nanotubes, the anode wiring layer 818 and out to the anode connector 802. The hydrogen ions can travel through the PEM 822 to be catalytically combined with the electrons input into the cathode connector 804, cathode wiring 816 and cathode wiring layer 820 in the presence of air received through the cathode inlet 834. Baffles 842 can provide for gas and liquid movement through the cathode cavity 808. Although three baffles 838 and 842 are illustrated, there can be fewer or more than three of each.

Figure 9A:
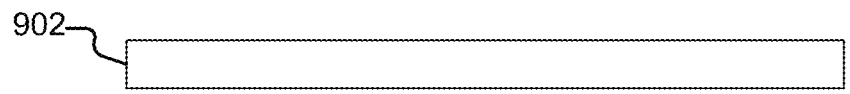
FIGS. 9A through 9D illustrate some of the steps in creating a reformer according to some embodiments of the invention.
Figure 9B:
Figure 9C:
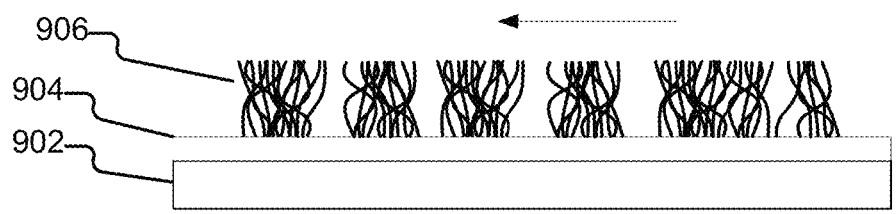
Figure 9D:
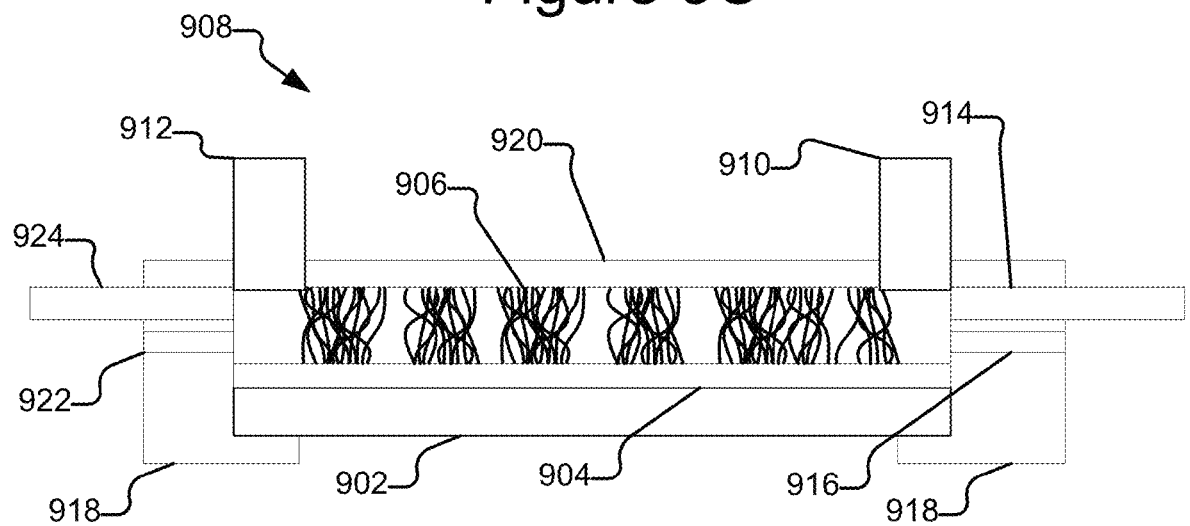

Reformed methanol fuel cells, or indirect methanol fuel cells, reform inputted methanol before being fed into a fuel cell. FIGS. 9A-D illustrate a series of steps in making a reformer in accordance with some embodiments of the invention. In FIG. 9A a porous substrate 902 can be obtained. Porous substrate 902 can be, for example, stainless steel. In the next step as illustrated in FIG. 9B, a film 904 can be deposited over the porous substrate 902. Film 904 can be for example palladium and can be deposited by, for example sputtering. FIG. 9C illustrates a patterned layer 906 of metalized carbon nanotubes affixed to film 904. The patterned layer 906 can be grown using a number of methods including those described with reference to FIG. 5. Patterned layer 906 can be metalized using the methods described above in reference to FIGS. 6 and 7. In some embodiments the metal can be palladium. Patterned layer 906 can be affixed to film 904 using a number of method including solder transfer to transfer the pattern 906 from a growth substrate to the film 906. The patterned layer 906 can be patterned in a serpentine pattern to provide a gaseous diffusion path from one side of the film 904 to the other in the direction indicated by the arrow as illustrated in FIG. 9C. FIG. 9D illustrates a reformer 908 according to some embodiments of the invention. Reformer 908 can include an inlet port 910, an outlet port 912, air inlet 914, heater 916, a casing 918, and a cover 920. In some embodiments, the reformer 908 can include a heater 922 and an air inlet 924. Methanol and water can be fed into the inlet port 910. The methanol and water can catalytically react in the presence of air, fed through air inlet 914, through the serpentine path provided by the patterned layer 906. An auto-reformer reactor is formed between the energy released from the air-methanol catalytic reaction to the energy consumed to generate hydrogen from the water-methanol reaction. Heater 916 can be used to start an auto-reforming reaction which can be self sustaining. The reformer 906 can operate at the desired 250 C temperature by maintaining the proper air-water-methanol mixture. Once the hydrogen is formed by the catalytic reaction which breaks the water and methanol down into hydrogen, the hydrogen can pass through the film 904 and porous layer 902 and can be used as an input flow to a fuel cell. In some embodiments a heater 922 and an air inlet 924 can be used to provide reaction at the outlet 912 to combust or otherwise dispose of any unreacted components. In some embodiments, a heating unit such as a glow plug can be used for heater 922 with or without air inlet 924.

Figure 10:
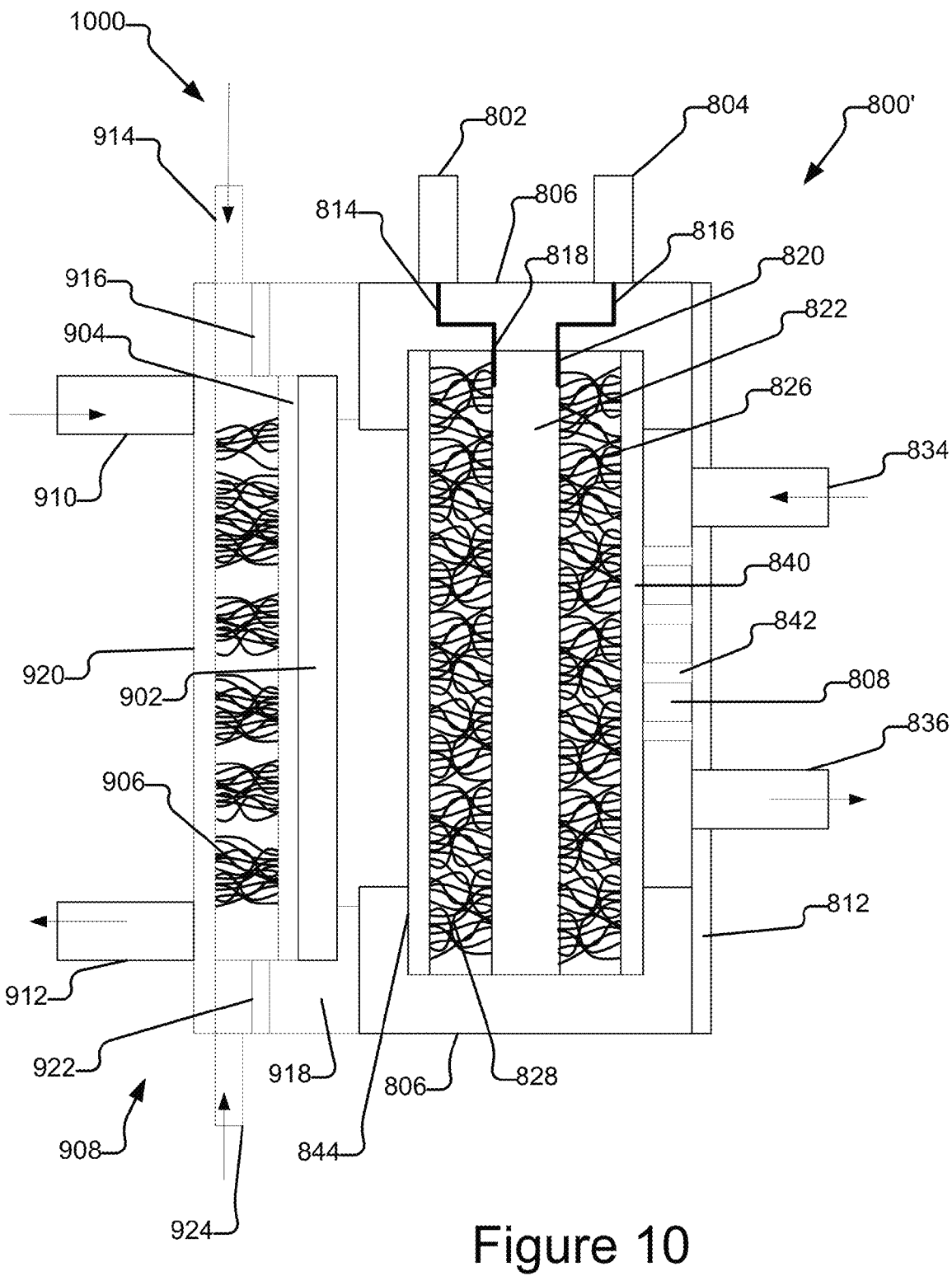
FIG. 10 illustrates a reformed fuel cell according to some embodiments of the invention.

FIG. 10 illustrates reformed methanol fuel cell 1000 according to some embodiments of the invention. Reformed fuel cell 1000 can comprise the reformer 908 of FIG. 9 in combination with a portion of fuel cell 800 of FIG. 8, so indicated as 800'. In reformed fuel cell 1000, the hydrogen produced by reformer 908 can be fed into fuel cell 800'. The operation of the fuel cell 800' is similar to that of fuel cell 800.

Figure 11:
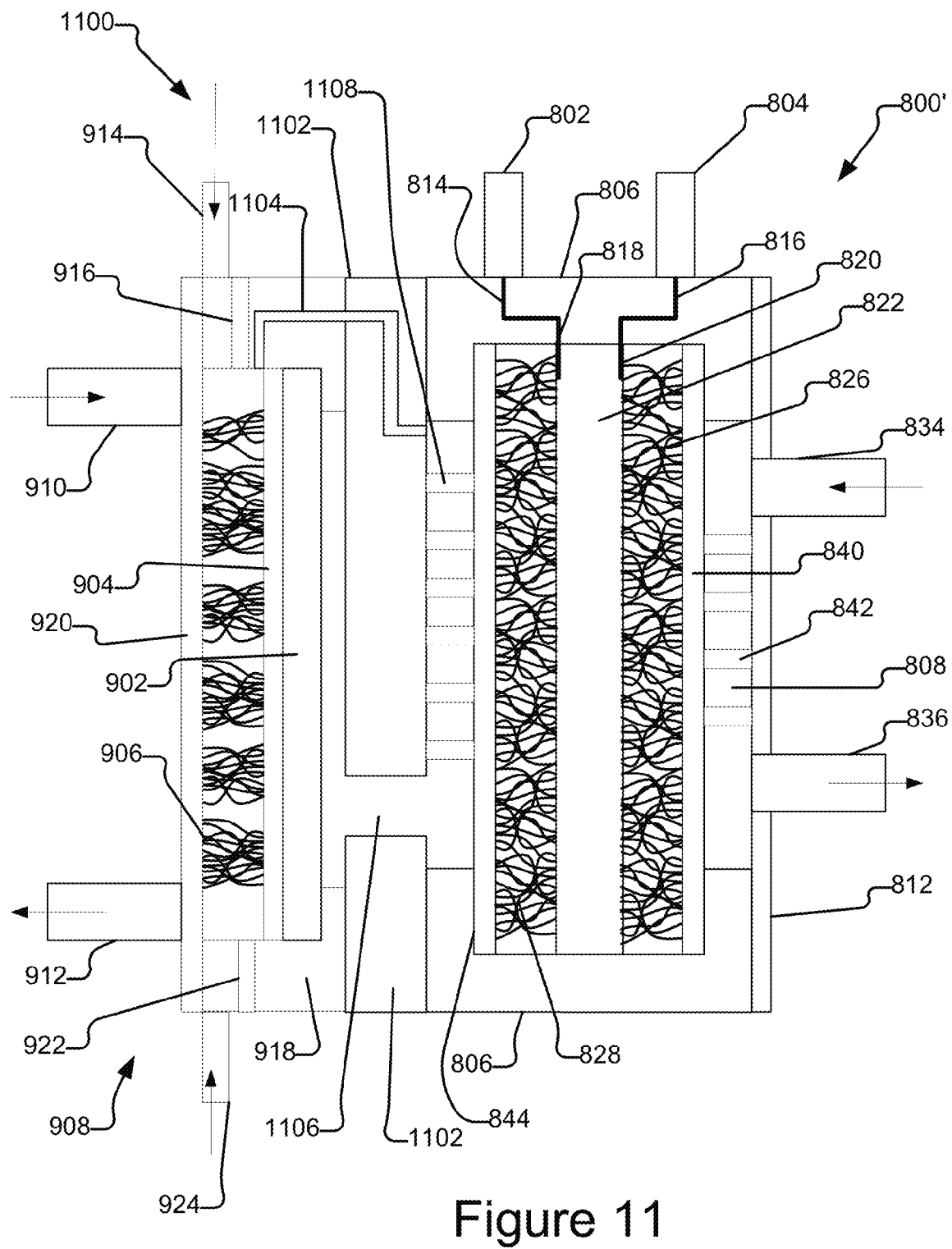
FIG. 11 illustrates a reformed fuel cell according to some additional embodiments of the invention.

FIG. 11 illustrates a reformed fuel cell 1100 according to some embodiments of the invention. Reformed fuel cell 1100 is in some respects similar to reformed fuel cell 1000 and can additionally comprise a separator 1102, a return channel 1104, a passage 1106, and baffles 1108. Elements in FIG. 11 having the same reference numbers as found in FIG. 10 can operate in the same manner as described in relation to FIG. 10. In FIG. 11, separator 1102 can provide for a separation between the reformer 908 and hydrogen fuel cell 800', the passage 1106 through which the output of the reformer can be directed, and/or a portion of return channel 1104. During operation, the output of the reformer 908 passes through the passageway 1106 and comes into contact with the hydrogen cell 800'. Baffles 1108 can be provided to disperse the incoming hydrogen, for example. Return channel 1104 can be provided to return any unreacted product back into the reformer 908.

Figure 12:
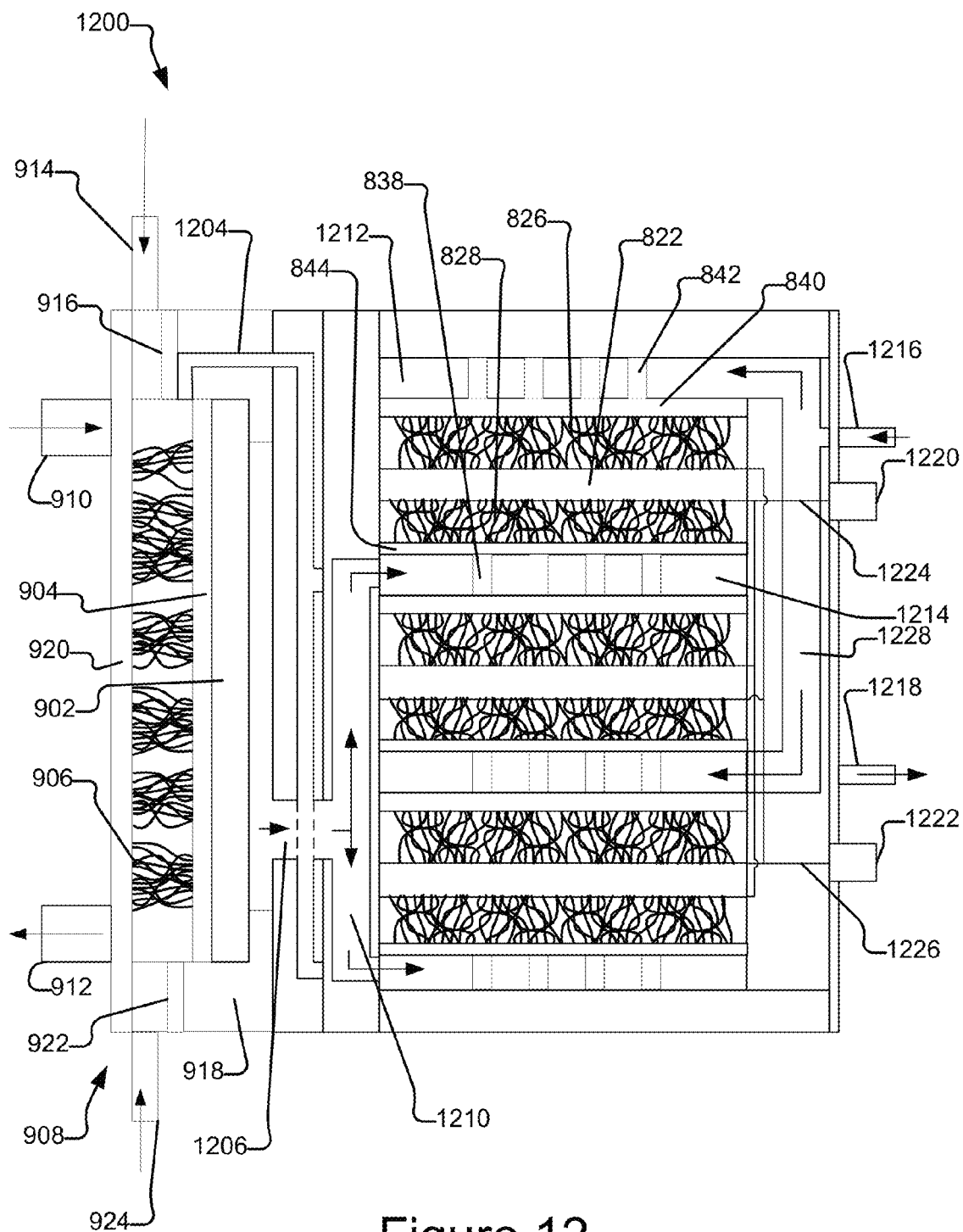
FIG. 12 illustrates a reformed and stacked fuel cell according to some embodiments of the invention.

FIG. 12 illustrates a fuel cell 1200 having a reformer in combination with an example fuel cell stack. Like numbered parts can correspond to their previously described parts. The output of the reformer 908 can pass through passage 1206 (which can be like passage 1106) into anode passageway 1210 where it becomes the input to the stacked fuel cells. Anode passageway directs the flow into anode portions of the stacked fuel cells where it flows through the baffles toward anode inlet end portion 1214. Any unreacted portions flow back through a channel (not shown) into return channel 1204 and back to the reformer 908. Cathode air inlet 1216 can provide for an opening to permit outside air to enter the cathode passageway 1228 where it flows in the direction of the arrows to each fuel cell cathode, through cathode baffles 842 to end portion 1212 and through a channel (not shown) to connect to cathode air outlet 1218. The anode terminal 1220 can be electrically connected to each of the anodes of the fuel cells through anode wiring 1224. The cathode terminal 1222 can be electrically connected to each of the cathode of the fuel cells via cathode wiring 1226.

As viewed in FIG. 12 the top two fuel cells can share a common anode passageway and baffles, and the bottom two share a common cathode passageway and baffles. Although only three stacked fuel cells are shown, one of ordinary skill in the art can appreciate after viewing FIG. 12 how to stack two or more than 3 fuel cells.

Figure 13:
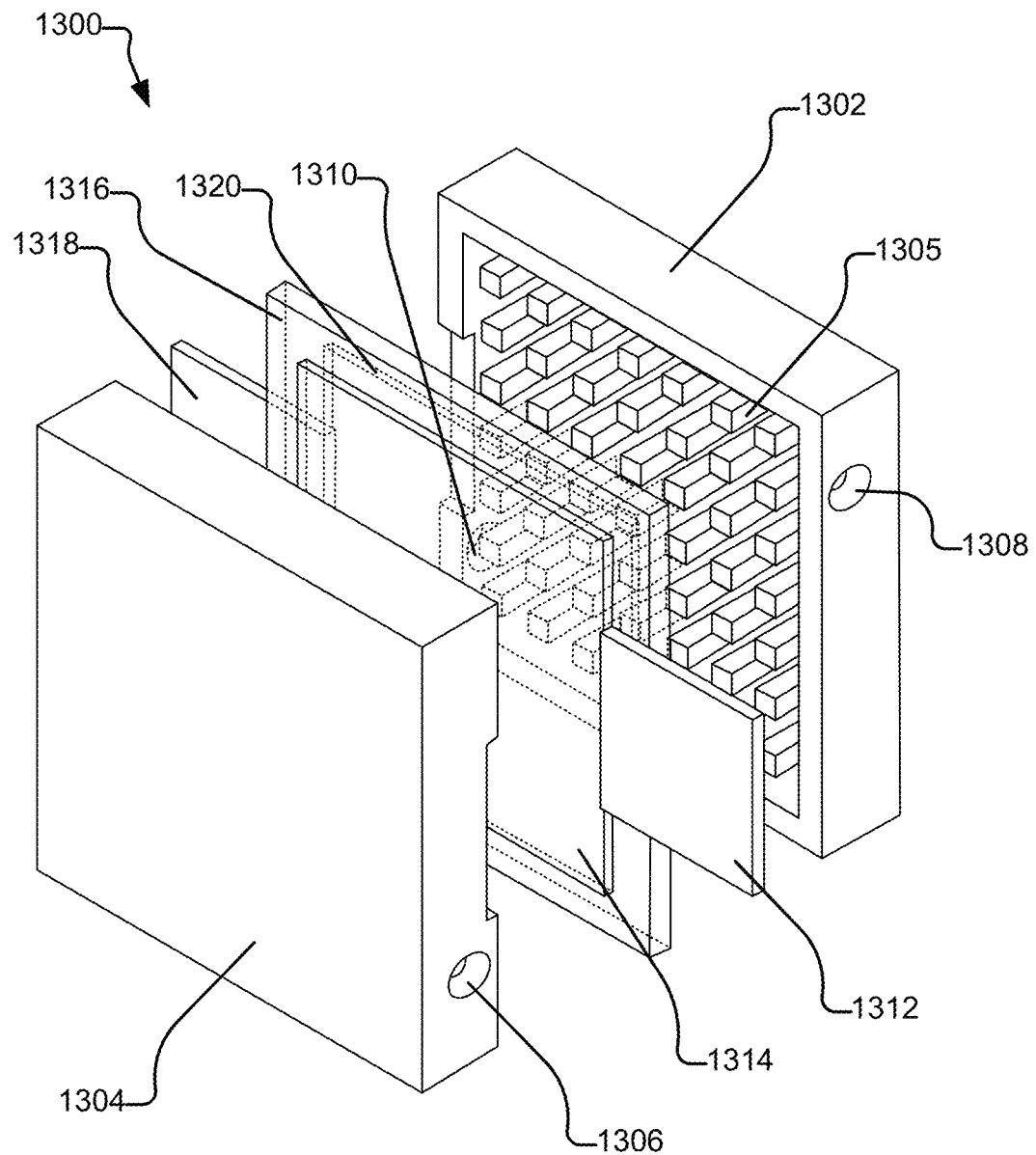
FIG. 13 illustrates a direct methanol fuel cell according to some embodiments of the invention.

FIG. 13 illustrates a direct methanol fuel cell 1300. The fuel cell 1300 can be constructed using a housing which can be in two or more pieces 1302, 1304. Integral baffles 1305 can be included in the housing pieces 1302, 1304. Inlet/outlet ports 1306, 1308, 1310 can be provided in the housing pieces 1302, 1304. For example, port 1306 can be used as a reactant inlet port, another port (not shown) can be used as a reactant outlet port, port 1308 can be used as an oxidant inlet port, and port 1310 can be used as an oxidant outlet port. A terminal 1312 can provide an electrical connection to an anode 1314. The anode 1314 can be like or can include any anode arrangement described above (including, for example, anode 204 and anode layer 828). Another terminal 1318 can electrically connect to a cathode 1320 (which can be like cathode 212 or cathode layer 826). Sandwiched between the anode 1314 and cathode 1320 can be proton exchange membrane 1316. Operation of the fuel cell 1300 can be as described above. The housing pieces 1302, 1304 can be rigid or flexible materials, including for example plastic materials.

Figure 14:
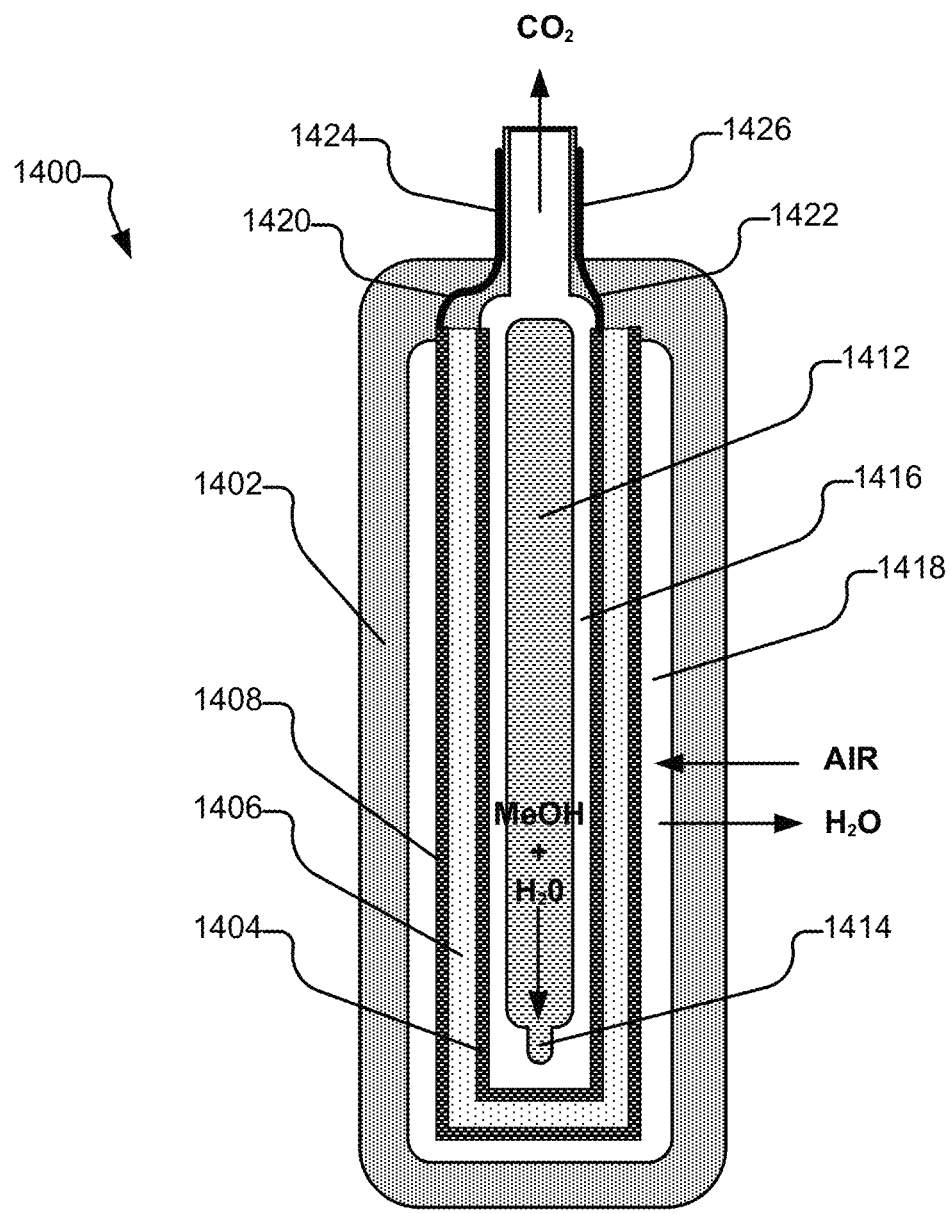
FIG. 14 illustrates a flexible fuel cell according to some embodiments of the invention.

FIG. 14 illustrates a flexible fuel cell 1400. The fuel cell can be constructed with a flexible housing 1402. The fuel cell can include an anode 1404 (which can be like anode 204, 828), a proton exchange membrane 1406 which can wrap around the anode, and a cathode 1408 (which can be like cathode 212 or cathode layer 826) which can wrap around the proton exchange membrane. The anode 1404, proton exchange membrane 1406 and cathode 1408 can also be constructed of flexible materials. Positioned inside the anode 1404 can be reactant reservoir 1412. The reactant reservoir 1412 can be filled with a fuel source, such as for example a mixture of methanol and water. The reactant reservoir 1412 can include a breakable bather 1414 which can be broken by squeezing or bending the fuel cell 1400 to enable the flow of fuel to the anodic chamber 1416. Reaction products from the anodic chamber 1416, such as for example carbon dioxide, can be vented from the fuel cell 1400. The flexible housing 1402 can be permeable, for example, to allow air to enter the cathodic chamber 1418 and/or to allow water to exit the cathodic chamber. Electrical connections 1420, 1422 can electrically connect the anode 1404 and cathode 1408 to terminals 1424, 1426 disposed on the exterior of the housing. The terminals 1424, 1426 can be used for extracting power from the device. In some embodiments, an additional clip on (not shown) power converter can attach to the terminals 1424, 1426 to condition power (e.g., voltage regulation, etc.) to operate an electronic device. The breakable barrier 1414 can be designed for one-time use, in which case the fuel cell 1400 may be discarded or recycled after use. Alternatively, the breakable barrier 1414 can be designed to reclose or otherwise allow for refilling the fuel cell 1400 with fuel to allow reuse. For example, in some embodiments, the fuel cell 1400 can include a fill port (not shown) to allow refill of the reactant reservoir 1414.

Although specific embodiments and applications of the invention have been described in this specification, these embodiments and applications are examples only, and many variations are possible.

What is claimed is:

1. A fuel cell comprising:
   an anode comprising a first catalyst layer, wherein said first catalyst layer comprises a plurality of carbon nanotubes;
   a cathode comprising a second catalyst layer, wherein said second catalyst layer comprises a plurality of carbon nanotubes;
   a proton exchange membrane disposed between said anode and said cathode;
   an anode connection electrically connected to said anode;
   a cathode connection electrically connected to said cathode; and
   a reformer disposed adjacent said anode and comprising a patterned layer of metalized carbon nanotubes configured in a pattern that defines a serpentine gaseous diffusion path adjacent to said anode.

2. The fuel cell of claim 1, wherein one of said anode and said cathode further comprises a coating disposed on said plurality of carbon nanotubes.

3. The fuel cell of claim 2, wherein said coating extends entirely along said plurality of carbon nanotubes.

4. The fuel cell of claim 3, wherein said coating comprises a conductive material selected from the group consisting of: platinum, ruthenium, gold, and combinations and alloys thereof.

5. The fuel cell of claim 2, wherein said coating comprises a plurality of electron conducting particles and a plurality of proton conducting particles.

6. The fuel cell of claim 5, wherein said electron conducting particles comprise a metal and said proton conducting particles comprise an ionomer.

7. The fuel cell of claim 1, wherein said reformer further comprises a porous substrate disposed between said patterned layer of metalized carbon nanotubes and said anode.

8. A fuel cell comprising:
   an anode comprising a first catalyst layer, wherein said first catalyst layer comprises a plurality of carbon nanotubes;
   a cathode comprising a second catalyst layer, wherein said second catalyst layer comprises a plurality of carbon nanotubes;
   a proton exchange membrane disposed between said anode and said cathode;
   an anode connection electrically connected to said anode; and
   a cathode connection electrically connected to said cathode,
   wherein one of said anode and said cathode further comprises a porous substrate from which said plurality of carbon nanotubes extend, said porous substrate being proximate to said proton exchange membrane.

9. The fuel cell of claim 8, further comprising a wiring layer coupled to ends of said plurality of carbon nanotubes distal from said porous substrate.

10. The fuel cell of claim 1, further comprising:
    a housing in which said anode, said cathode, and said proton exchange membrane are disposed to define an anodic cavity and a cathodic cavity;
    a reactant inlet port in said housing;
    a reactant outlet port in said housing, said reactant inlet port and said reactant outlet port in fluid communication with said anodic cavity and said anode;
    an oxidant inlet port in said housing; and
    an oxidant outlet port in said housing, said oxidant inlet port and said oxidant outlet port in fluid communication with said cathodic cavity and said cathode.

11. The fuel cell of claim 10, further comprising baffles disposed within each of said anodic cavity and said cathodic cavity and positioned to encourage fluid diffusion into said anode and into said cathode.

12. A fuel cell comprising:
    an anode comprising a first catalyst layer, wherein said first catalyst layer comprises a plurality of carbon nanotubes;
    a cathode comprising a second catalyst layer, wherein said second catalyst layer comprises a plurality of carbon nanotubes;
    a proton exchange membrane disposed between said anode and said cathode;
    an anode connection electrically connected to said anode;
    a cathode connection electrically connected to said cathode;
    a housing in which said anode, said cathode, and said proton exchange membrane are disposed to define an anodic cavity and a cathodic cavity;
    a reactant inlet port in said housing;
    a reactant outlet port in said housing, said reactant inlet port and said reactant outlet port in fluid communication with said anodic cavity and said anode;
    an oxidant inlet port in said housing;
    an oxidant outlet port in said housing, said oxidant inlet port and said oxidant outlet port in fluid communication with said cathodic cavity and said cathode;
    baffles disposed within each of said anodic cavity and said cathodic cavity and positioned to encourage fluid diffusion into said anode and into said cathode; and
    a reformer disposed between said reactant inlet port and said anodic cavity, wherein said reformer comprises:
      a porous substrate disposed adjacent said anodic cavity;
      a film disposed on said porous substrate opposite said anodic cavity; and
      a patterned layer of metalized carbon nanotubes extending from said film, said metalized carbon nanotubes defining a serpentine path along a surface of said film between said reactant inlet port and said reactant outlet port.

13. The fuel cell of claim 12, further comprising a separator disposed between said reformer and said anodic chamber wherein said separator defines:
    a passage providing fluid communication between said anodic cavity and a side of said porous substrate adjacent to said anodic cavity; and
    a return channel providing fluid communication between said anodic cavity and said reactant inlet port.

14. A fuel cell comprising:
    an anode comprising a first catalyst layer, wherein said first catalyst layer comprises a plurality of carbon nanotubes;

a cathode comprising a second catalyst layer, wherein said second catalyst layer comprises a plurality of carbon nanotubes;

a proton exchange membrane disposed between said anode and said cathode;

an anode connection electrically connected to said anode;

a cathode connection electrically connected to said cathode;

a reactant reservoir comprising a breakable barrier, wherein said anode is wrapped around said reactant reservoir to define an anodic chamber and separated from said reactant reservoir by said breakable barrier, wherein said proton exchange membrane is wrapped partially around said anode, and wherein said cathode is wrapped partially around said proton exchange membrane; and a housing disposed around said cathode to define a cathodic chamber, wherein said housing is air permeable.

15. A method of making a fuel cell comprising:

obtaining a substrate having a plurality of carbon nanotubes;

placing said substrate into a chamber;

applying a first precursor gas into said chamber, wherein said first precursor gas comprises molecules having affinity to carbon to create a monomer layer surrounding said carbon nanotubes;

applying a second precursor gas into said chamber, wherein said second precursor gas comprises molecules having affinity to said first precursor gas to react said monomer layer to produce a catalyst layer on said carbon nanotubes thereby obtaining an electrode;

assembling two of said electrodes with a proton exchange membrane to form said fuel cell.

16. The method of claim 15, wherein said applying a second precursor gas comprises an introduction phase and a soak phase.

17. The method of claim 15, wherein said first precursor gas is comprises any of: (CH3)3(CH3C5H4)P7, Ru(Bu-Me-amd)2(CO)2, and combinations thereof.

18. The method of claim 15, further comprising repeating said applying a first precursor gas and said applying a second precursor gas to form a desired thickness of said coating.

19. The method of claim 18, wherein said repeating is continued until substantially all of said plurality of carbon nanotubes are coated.

20. The method of claim 15, further comprising:

applying a third precursor gas into said chamber, wherein said third precursor gas comprises molecules having affinity to carbon to create a monomer layer surrounding said carbon nanotubes;

applying a fourth precursor gas into said chamber, wherein said fourth precursor gas comprises molecules having affinity to said third precursor gas to react said monomer layer to produce a catalyst layer comprising two different materials on said carbon nanotubes.

21. The method of claim 15, wherein said obtaining a substrate having a plurality of carbon nanotubes comprises:

obtaining a growth substrate;

depositing growth material on said growth substrate; and growing a plurality of carbon nanotubes on said growth substrate.

22. The method of claim 21, further comprising:

providing a second substrate; and forcing ends of said carbon nanotubes into said second substrate; and detaching said carbon nanotubes from said growth substrate.

23. The method of claim 15, wherein an aspect penetration ratio of said catalyst layer is greater than 10.

* * * * *